United States Patent

Douville et al.

[11] Patent Number: 5,832,906
[45] Date of Patent: Nov. 10, 1998

[54] INTENSIFIER APPARATUS AND METHOD FOR SUPPLYING HIGH PRESSURE GASEOUS FUEL TO AN INTERNAL COMBUSTION ENGINE

[75] Inventors: Brad Douville; Alain Touchette; Philip G. Hill; Adrian J. Post, all of Vancouver; Mark A. Epp, Langley, all of Canada

[73] Assignee: Westport Research Inc., Vancouver, Canada

[21] Appl. No.: 3,407

[22] Filed: Jan. 6, 1998

[51] Int. Cl.[6] ................................................ F02M 21/04
[52] U.S. Cl. ............................................................. 123/527
[58] Field of Search ............................................... 123/527

[56] References Cited

U.S. PATENT DOCUMENTS

| | | | |
|---|---|---|---|
| 4,523,548 | 6/1985 | Engel et al. | 123/527 |
| 5,351,726 | 10/1994 | Diggins | 123/527 |
| 5,375,580 | 12/1994 | Stolz et al. | 123/527 |
| 5,501,200 | 3/1996 | Bogartz | 123/527 |
| 5,505,232 | 4/1996 | Barclay | 123/527 |
| 5,694,985 | 12/1997 | Diggins | 123/527 |

*Primary Examiner*—John T. Kwon
*Attorney, Agent, or Firm*—McAndrews, Held & Malloy, Ltd.

[57] ABSTRACT

The invention relates to an apparatus and method for supplying high pressure gaseous fuel from a storage vessel to a vehicle's internal combustion engine. More particularly, the invention is a fuel supply system with three main components: the storage vessel; an intensifier; and, an accumulator vessel. Fuel passages connect each one of the components directly with the other two components. The intensifier has a plurality of compression chambers and one of the compression chambers can be by-passed when the intensifier is operating in a low capacity mode, depending upon the pressure in the storage vessel. The intensifier operates continuously. When no fuel compression is required, the intensifier runs in an idle mode with the respective inlets and outlets of the compression chambers connected by fuel passages, thus preventing any fuel compression. The loading to the intensifier actuating mechanism is balanced in all modes of operation.

11 Claims, 6 Drawing Sheets

INTENSIFIER APPARATUS AND METHOD FOR SUPPLYING HIGH PRESSURE GASEOUS FUEL TO AN INTERNAL COMBUSTION ENGINE

TECHNICAL FIELD OF THE INVENTION

The invention relates to an apparatus and method for supplying high pressure gaseous fuel from a storage vessel to a vehicle's internal combustion engine. More particularly, the invention is a fuel supply system where the pressure in the storage vessel is variable and it is important to consistently maintain fuel injection pressure within a pre-determined acceptable operating range.

BACKGROUND OF THE INVENTION

To inject gaseous fuel into a combustion engine, the fuel pressure must be raised higher than the pressure in the piston chamber. For a compression ignition engine, such as a diesel engine, a fuel pressure as high as 200 bar (approx. 3,000 psi) may be required to inject the fuel and to ensure combustion. Compressed fuel is typically supplied from pressure rated storage vessels carried on board the vehicle. As the fuel is consumed, the pressure in the storage vessels drops. To consistently maintain the pressure of gaseous fuels within a pre-determined acceptable operating range for injection into the combustion chamber of the internal combustion engine, it is necessary to provide a means for increasing the pressure of the gaseous fuel. The pre-determined acceptable operating range is determinable from the optimal injection pressure which depends upon the particular characteristics of a given engine.

An intensifier is a compressor which increases the pressure of a gas supplied from a variable pressure source to a higher pressure. An intensifier can be used to increase the fuel pressure from a fuel storage tank on a vehicle for injection of the fuel into the engine.

It is well known to locate a small accumulator vessel near the fuel injectors to consistently maintain the gaseous fuel pressure at the injectors within a pre-determined acceptable operating range despite the varying pressure in the fuel supply system and storage vessel. When the pressure decreases in the accumulator, it is known to use an intensifier to deliver compressed gaseous fuel from the storage vessel to the accumulator vessel. When the pressure in the accumulator rises to the upper limit of the pre-determined acceptable operating range the intensifier typically shuts off. Accordingly, pressure in the accumulator is kept within a pre-determined acceptable operating range. In conventional fuel supply systems, the compressor is only activated when it is needed to raise the pressure in the accumulator vessel.

U.S. Pat. No. 4,615,259, Anbe, discloses an intensifier using a Scotch-yoke design. The Scotch-yoke mechanism has a crank pin eccentrically extending from an end of a main drive shaft. A slider rotatably surrounds the crank pin. A yoke defines a pair of opposed parallel sliding surfaces for confining the motion of the slider only to the sliding motion along the surfaces. The yoke further defines a pair of outwardly extending connecting rods for connecting oppositely disposed pistons on either side of the yoke. The orbital motion about the axis of the main drive shaft causes the slider to reciprocate the yoke and the oppositely disposed pistons. Diaphragms separate the volume in which oil is provided to lubricate sliding and rolling bearings from the volumes associated with oil-free gas compression.

U.S. Pat. No. 5,033,940, Baumann, also describes a compressor using a Scotch yoke design and sliding contact between the slider, which rotatably surrounds the crank pin, and the parallel sliding surfaces of the yoke. The quantity of lubricating oil entering the compression space from the volume occupied by the lubricated bearings is minimized by a dry gap ring seal. The piston liner and piston are made of materials having close to the same coefficient of thermal expansion. With the object of supporting dry (oil-free) compression to pressures as high as 500 bar, the pistons each have a ring seal and a guide ring made of a self-lubricating material, such as Teflon, suitable for dry running.

U.S. Pat. No. 5,078,017, Zomes, discloses a Scotch yoke mechanism in which the slider bearings described by Anbe and by Baumann are replaced by rolling contact between the outer race of, or a ring surrounding, a roller or ball bearing enclosing the crank pin and the parallel surfaces of the yoke, which is rigidly connected to the compression pistons. A further distinction of this disclosure from those of Anbe and of Baumann is the provision of two laterally offset tracks, on opposite sides of the slot in the yoke, each of which engages one of two coaxial rollers, both mounted on the same crank pin.

U.S. Pat. No. 5,327,863, Downton and Feilden, also discloses a Scotch yoke mechanism which can be used to actuate pistons from a crankshaft. The device includes slider bearings between parallel inner surfaces of the yoke and the slider block which is rotatably connected to the crank pin. Provision is made for stiffening of the yoke, to withstand deflections due to the bending moments associated with high compression load, and for side plates which control the relative lateral locations of the slider block and yoke.

These disclosures show that the Scotch yoke mechanism, both with sliding and rolling contact at the inner parallel surfaces, of the yoke is well known. However, they do not disclose means for non-sliding control of the roller motion relative to the track. Nor do they disclose means for coping with the special problems associated with compression to a desired high pressure from a supply pressure which is variable from some extreme low value right up to the desired high pressure. These problems are of sufficient importance that the device used for compression in this case is designated by the special name intensifier.

There are particular problems in applying conventional compression technology when the flow demand is highly variable, and when the inlet pressure varies from a low value to a value near the high outlet pressure.

1. Fuel consumption requirements vary depending upon the demand made of the engine. For example, the engine may consume more fuel while the vehicle is accelerating or climbing a hill. At other times much less fuel is needed, for example, when the vehicle is maintaining a constant velocity or descending a hill. For a vehicle with a compression ignition engine, during normal operation, the rate of fuel consumption may vary by about a factor of ten. Activating the intensifier only when pressure in the accumulator vessel decreases below a pre-determined level causes the intensifier to cycle on and off. This kind of operation subjects the intensifier to accelerated wear, reducing its service life. Consequently, this is a problem in applications where reliability, maintenance costs, and long service life are important considerations.

2. Since the fuel pressure in the storage vessel varies as the fuel is consumed, this could cause large unbalanced forces within the intensifier if the inlet pressure is high. The supply pressure may vary by a factor of 10. If the intensifier is designed for full delivery at low inlet pressure, there may be a large unbalanced force on the first stage piston when the inlet pressure is high and the first compression stage is not needed. This can pose a difficulty in design or make the device less durable.

3. Since the supply pressure can rise nearly to the delivery pressure, and it is not generally feasible to pressurize the crankcase of the intensifier to supply pressure, the blowby gas which escapes from the high pressure cylinder with a conventionally sealed piston cannot be directed to the supply tank and would need to be vented to the atmosphere with undesirable implications for safety and for the environment.

Accordingly, there is a need for an apparatus which is adapted for supplying gaseous fuel consistently at a pressure within an pre-determined acceptable operating range, and operating under the difficult and variable operating conditions inherent in a gaseous fuel supply system for an internal combustion engine. Also there is a need for a means of preventing the leakage of gas from the compression space to the crankcase.

SUMMARY OF THE INVENTION

The invention provides an intensifying apparatus and method for supplying high pressure gaseous fuel at a consistent pressure, within a pre-determined acceptable operating range, to an internal combustion engine.

The invention in one embodiment provides a fuel supply system which uses an intensifier which runs continuously, to reduce wear caused by cycling between on and off modes. The invention also provides a fuel supply system supplied by a variable pressure fuel source, which consistently supplies gaseous fuel at a pressure within a pre-determined acceptable operating range. In another aspect, the invention provides a fuel supply system which has the capacity to deliver fuel at the rate required by an internal combustion engine where such fuel consumption rates vary by about a factor of ten.

The apparatus of the invention has three main components, connected to each other by a plurality of fuel passages. The three main components are a storage vessel, an intensifier, and an accumulator vessel. The storage vessel is a pressure vessel which stores a quantity of compressed gaseous fuel. The accumulator is much smaller than the storage vessel and it maintains a quantity of the gaseous fuel at an injection pressure that is within a pre-determined acceptable operating range. The intensifier has a first compression chamber and a second compression chamber for compressing the gaseous fuel to increase the pressure of the gaseous fuel supplied from the storage vessel. The intensifier can have more than one compression stage, thereby requiring a plurality of chambers.

The fuel passages direct the flow of the gaseous fuel from the storage vessel to the accumulator vessel. The fuel passages also provide connections between each of the storage vessel, the intensifier, and the accumulator vessel. A first passage connects an outlet from the storage vessel to an inlet to the first compression chamber. A second passage connects an outlet from the first compression chamber to an inlet to the second compression chamber. A third passage connects an outlet from the second compression chamber to an inlet to the accumulator vessel. A first by-pass passage, can be selected for fuel flow to by-pass the first compression chamber. A second by-pass passage, can be selected for fuel flow to by-pass the second compression chamber.

In an embodiment of the invention a control apparatus is provided for automatically controlling fuel flow through the first and second by-pass passages according to the fuel pressures measured in the accumulator vessel and the storage vessel. Valves mounted in each of the first and second by-pass passages are used to control fuel flow through the by-pass passages. A first pressure measuring instrument is mounted to the accumulator vessel to measure pressure of the gaseous fuel inside the accumulator vessel. A second pressure measuring instrument is mounted to the first fuel passage for measuring pressure of the gaseous fuel supplied from the storage vessel.

In another embodiment of the invention, provision of complementary curvatures on the surfaces of the roller and tracks for non-sliding control of the rolling contact motion between the yoke and the rolling ring rotatably surrounding the crank pin.

In another embodiment of the invention, a separate high pressure source of oil is connected to the sealing space between the piston and the cylinder of each stage of compression such that the sealing oil supply pressure always exceeds the gas pressure in the compression space, so that no gas can leak past the piston into the crankcase volume.

In another embodiment of the invention, a fourth passage connects the first passage to a compartment in the intensifier. The compartment is located behind a piston of the first compression chamber such that the compartment is separated from the compression chamber by the piston.

In one specific aspect, the invention is directed to an apparatus for supplying high pressure gaseous fuel to a fuel injector of an internal combustion engine, said apparatus comprising: (a) a fuel storage vessel; (b) an intensifier having a first compression chamber with a first piston therein, and a second compression chamber with a second piston therein; (c) an accumulator vessel for holding a quantity of gaseous fuel at an injection pressure within a pre-determined acceptable operating range; and, (d) a plurality of fuel lines for directing flow of said gaseous fuel from said storage vessel to said accumulator vessel and for providing direct connections between said fuel storage vessel, said intensifier, and said accumulator vessel, said fuel passages including: (i) a first fuel line for connecting an outlet from said fuel storage vessel to a first inlet to said first compression chamber; (ii) a second fuel line for connecting a first outlet from said first compression chamber to a second inlet to said second compression chamber; (iii) a third fuel line for connecting a second outlet from said second compression chamber to an inlet to said accumulator vessel; (iv) a first closeable by-pass passage, connecting the first fuel line with the second fuel line; and (v) a second closeable by-pass passage, connecting the fuel line with the third fuel line.

The apparatus can further include a control apparatus for automatically controlling fuel flow through one or the other or both of said first and second closeable by-pass passages based upon fuel pressure measurements at said accumulator vessel and said fuel storage vessel. The control apparatus can further include: (a) a first valve mounted in said first by-pass passage for controlling fuel flow through said first by-pass passage; and (b) a second valve mounted in said second by-pass passage for controlling fuel flow through said second by-pass passage.

The apparatus can further include a passage connecting a compartment located behind the first piston of the first compression chamber on a side opposite to the first compression side of the first piston for enabling pressures in said first compression chamber to balance. The apparatus can further include a check valve on each of the first and second inlets and the first and second outlets of the first and second compression chambers for controlling the direction of flow of the gaseous fuel.

The apparatus can further include a heat exchanger associated with the second fuel line for cooling gaseous fuel after it has been compressed by the first piston in the first compression chamber. The apparatus can further include a heat exchanger associated with the third fuel line for cooling gaseous fuel after it has been compressed by the second piston in the second compression chamber before it enters the accumulator vessel.

In the apparatus as defined, the first piston can have a larger end area than the second piston, for balancing the forces during respective compression strokes and to accommodate differences in volumetric flow through the first and second compression chambers caused by compression of the gaseous fuel in the first compression chamber.

The apparatus as defined can include: (e) a sealing oil storage tank; (f) a sealing oil pump connected to the sealing oil tank; (g) a first sealing oil line from the sealing oil pump to a high pressure sealing location associated with the first compression chamber; and (h) a second sealing oil line from the sealing oil pump to a high pressure sealing location associated with the second compression chamber.

The apparatus can include at least two gaseous fuel storage vessels and the effect of two stage operation can be obtained by sequential use of a single stage in first compressing the gaseous fuel from a low pressure tank to an intermediate pressure tank, and then compressing the gaseous fuel from the intermediate pressure tank to the accumulator vessel which directly supplies the engine.

The invention in another specific aspect includes intensifier for supplying high pressure gaseous fuel to a fuel injector of an internal combustion engine comprising: (a) a hollow chamber; (b) a reciprocating member in said chamber; (c) a first piston and a first fuel compression chamber, said first piston being driven by said reciprocating member; (d) a second piston and a second fuel compression chamber, said second piston being driven by said reciprocating member; (e) a one-way inlet and a one-way outlet associated with the first fuel compression chamber; (f) a one-way inlet and a one-way outlet associated with the second fuel compression chamber; and (g) a passageway connecting the one-way outlet of the first fuel compression chamber with the one-way inlet of the second fuel compression chamber.

The method of supplying high pressure gaseous fuel to fuel injectors for an internal combustion engine includes the following steps:

(a) Supplying gaseous fuel from a variable pressure source;

(b) Regulating the pressure of the gaseous fuel to maintain an injection pressure within a pre-determined acceptable operating range using an intensifier having a plurality of compression chambers; and (c) By-passing a compression chamber of the intensifier when the pressure inside the storage vessel is higher than a pre-determined pressure.

Another embodiment of the method of the invention includes the step of by-passing the intensifier and continuing to operate the intensifier in an idle mode without compressing any gaseous fuel.

In the method as defined, the step of providing back pressure to the piston in a first of the compression chambers can be added to balance operating loads applied to the intensifier during idle running speed. The sealing oil from a high pressure sealing oil source can be directed to sealing spaces between the plurality of pistons and cylinders in which the pistons travel at a pressure which is higher than the pressures of the compression chambers, thereby preventing leakage of gas past the plurality of pistons.

In a specific aspect, the invention is directed to a method of supplying high pressure gaseous fuel to a fuel injector for an internal combustion engine, the method comprising the steps of: (a) drawing the gaseous fuel from a variable pressure fuel source; (b) regulating the pressure of the gaseous fuel to maintain a fuel injection pressure within a pre-determined acceptable operating range using an intensifier having a plurality of pistons and compression chambers; (c) operating the intensifier without compressing any gaseous fuel when the injection pressure is greater than a first pressure P1 which is equal to an upper limit of the pre-determined acceptable operating range; (d) compressing gaseous fuel in first and second compression chambers of the intensifier when the injection pressure decreases to a second pressure P2 which is equal to a lower limit of the pre-determined acceptable operating range and the fuel source pressure is less than a pre-determined supply pressure P3; and, (e) compressing gaseous fuel in the second compression chamber and by-passing the first compression chamber when the injection pressure decreases to P2 and the fuel source pressure is greater than P3.

The method can include at least two fuel sources, and the effect of two stage operation can be obtained by sequential use of a single stage in first compressing the gas from a low pressure tank to an intermediate pressure tank and then compressing the gas from the intermediate pressure tank to an accumulator which directly supplies the engine.

An advantage of the apparatus of the invention is that the by-pass passages allow the apparatus to be operated in three modes: a first mode where the intensifier is completely by-passed and gas is not compressed; a second mode where only one of the compression chambers is by-passed; and a third mode where all of the compression chambers are used to compress gaseous fuel. These three modes provide flexibility which enables the apparatus to operate efficiently over a broad range of supply pressures and fuel consumption rates.

Another advantage of the apparatus is that the intensifier is continuously activated. This avoids the wear caused in conventional fuel supply systems by cycling between on and off modes, dictated by the demand for compressed gaseous fuel. With the apparatus of the invention, when no compression is needed, the intensifier is simply by-passed, and the intensifier continues to run idle.

Another advantage of the apparatus is the ability to compensate by pressure balancing for the large out-of-balance forces would otherwise be encountered when the inlet pressure rises to near the outlet pressure.

Another advantage of the apparatus is the possibility of preventing any gaseous fuel reaching the environment.

BRIEF DESCRIPTION OF DRAWINGS

The present invention will be further understood from the following description with references to the drawings in which.

DETAILED DESCRIPTION OF SPECIFIC EMBODIMENTS OF THE INVENTION

The invention is an apparatus and method for supplying high pressure gaseous fuel to an internal combustion engine. The subject intensifier application differs from conventional compressors in a number of aspects. Firstly, the intake pressure varies considerably, by a factor of 10. It is thus a variable intake pressure compressor or intensifier. Secondly, the mass flow requirements at the exhaust of the intensifier vary. This variation exists because sometimes the internal combustion engine is subject to heavy load and needs a lot of high-pressure gas, but other times it is idling and needs very little gas. Generally, there is a variation by a factor of 10 in the mass flow requirements. The intensifier according to the invention deals with the variable mass flow requirement by compressing gas only when it is needed to maintain high pressure in an accumulator. The applicant has determined that the best way to suppress the compression of gas when it is not required to operate the intensifier with equal pressure on intake and exhaust. This strategy essentially requires that the intensifier run "unloaded", or without compressing any gas. The intensifier according to the invention incorporates special features to deal with this situation and with the variable pressure ratio. These are described below.

Figure 1:
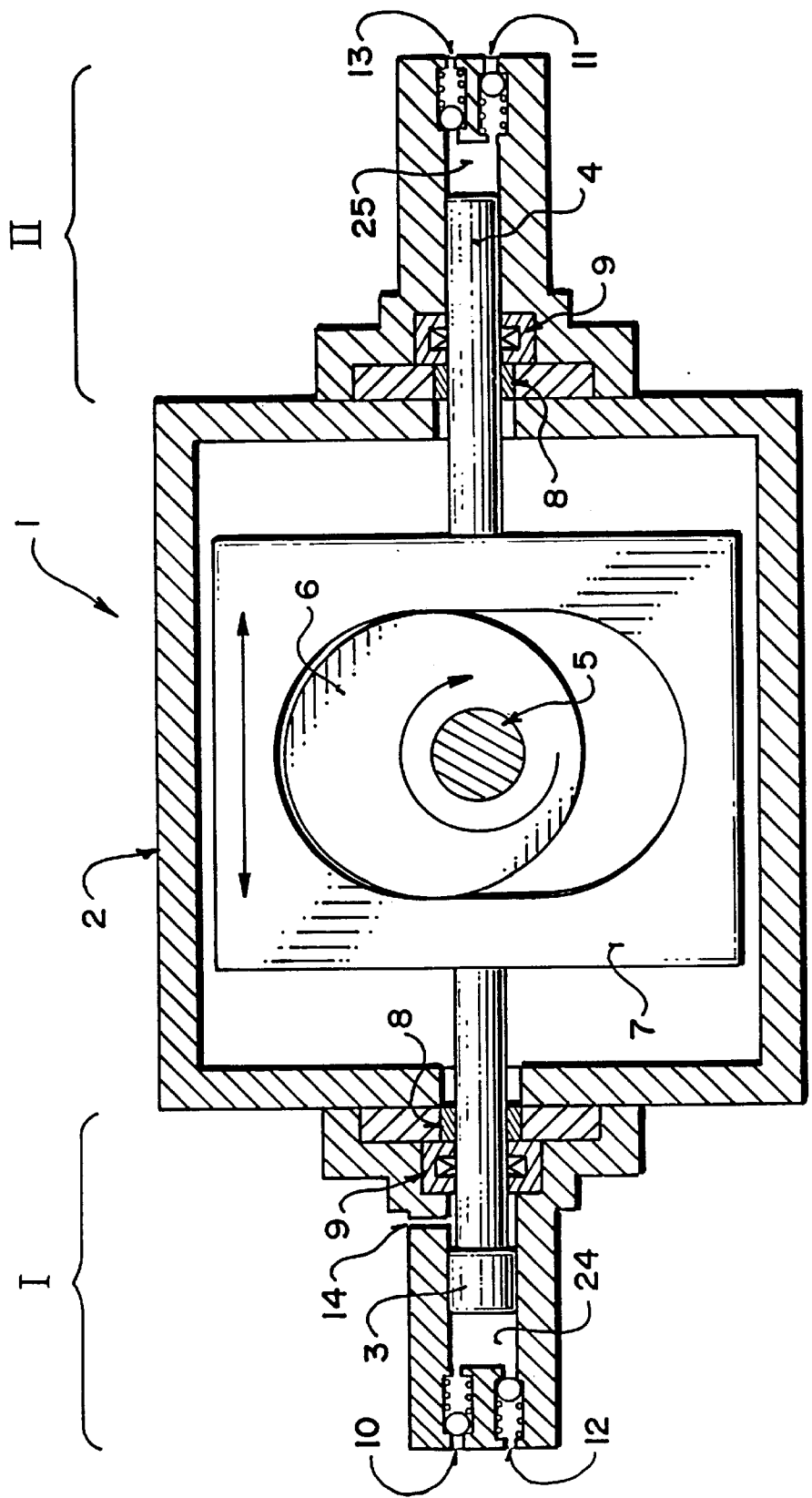
FIG. 1 represents an enlarged sectional view of an intensifier according to an embodiment of the invention.
Figure 2:
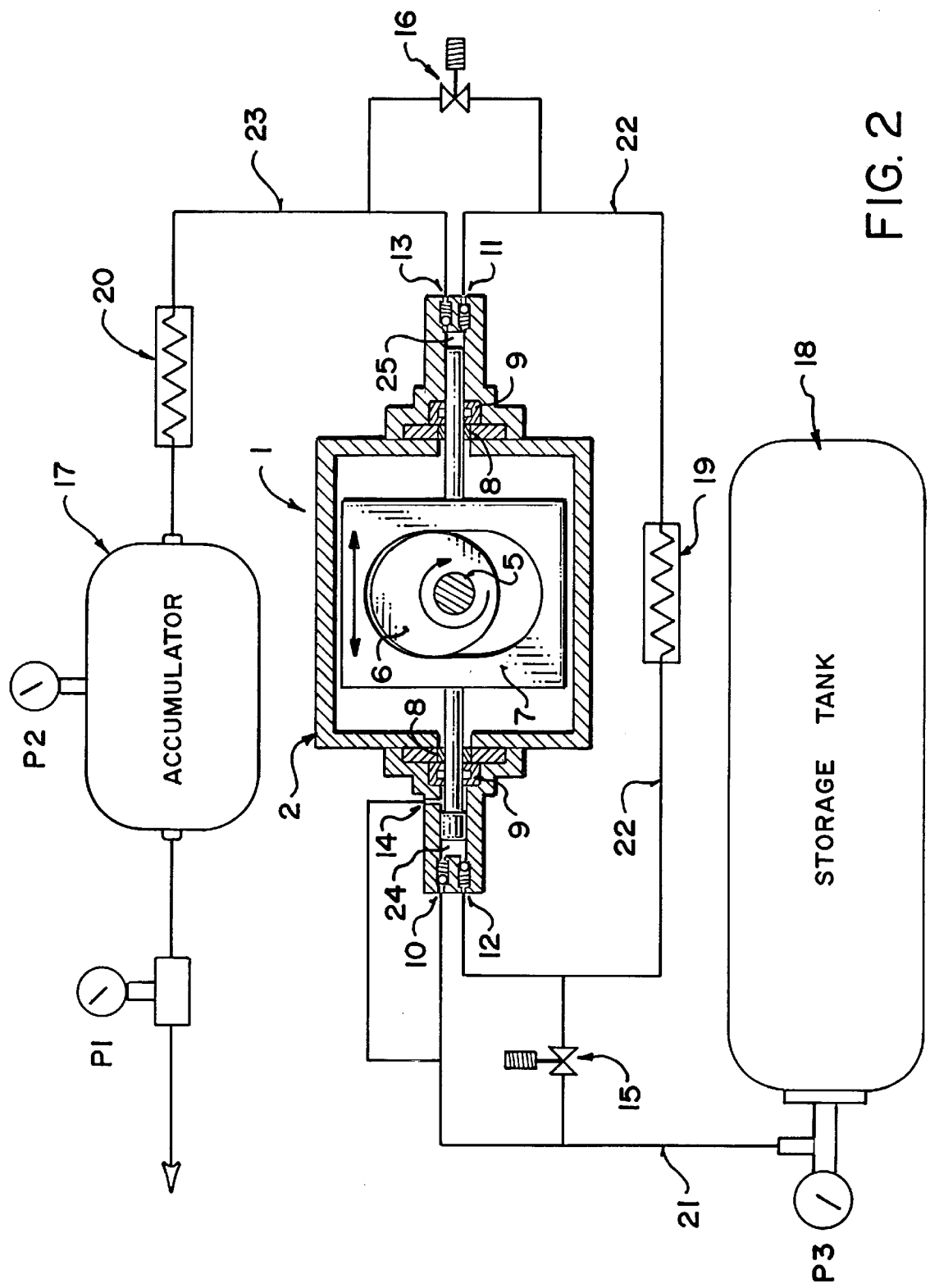
FIG. 2 represents a flow diagram illustrating the components and operation of an intensifier for raising fuel pressure from a fuel storage tank to a higher pressure for injection into an engine.

FIG. 1 represents an enlarged sectional view of an intensifier according to an embodiment of the invention. FIG. 2 represents a flow diagram illustrating the components and operation of an intensifier for raising fuel pressure from a fuel storage tank to a higher pressure for injection into an engine.

Referring to FIG. 2, there are three main components. These three components are joined by fuel passages which connect each one of the components to the other two components. The first main component is fuel storage vessel 18. Storage vessel 18 is a pressure rated vessel which holds compressed gaseous fuel. While only one vessel 18 is shown, it will be understood that a vehicle may use several storage vessels to increase the amount of gaseous fuel which can be stored on board the vehicle. As the fuel is consumed, the fuel pressure decreases in storage vessel 18. The second component is an intensifier 1, as described previously. The third component is an accumulator 17.

The intensifier is composed of a first stage I and of a second stage II, as illustrated in FIG. 1. The intensifier 1 is constructed of a hollow housing 2 with hollow protrusions on opposite sides. The pistons 3 and 4 in each protrusion reciprocate respectively in compression chambers 24 and 25 and are actuated by a scotch yoke mechanism. The scotch yoke mechanism comprises a rotating shaft 5 which drives an eccentric disk 6 which reciprocally forces a moving bloc 7 to oscillate from side to side, thereby sequentially actuating pistons 3 and 4. The pistons 3 and 4 are guided and supported by bushings 8 on each piston 3 and 4. The cylinders in the two protrusions are sealed to prevent leakage to the actuating chamber of the housing. Each compression chamber 24, 25 has a respective intake valve 10, 11 and a respective exhaust valve 12, 13.

When the block 7 moves to the left, as indicated by the directional arrow, it moves piston 3 to the left, and also piston 4 to the left. On the return stroke, the block 7 forces the pistons 3 and 4 to move to the right. Gas is thereby sequentially forced in through the intake valves 10 and 11, in alternating strokes, and out through exhaust valves 12 and 13 on reverse alternating strokes. The piston 3 of the first stage I is larger than that of the piston 4 of the second stage II because of the different volumetric gas flows and because of the need to balance the forces acting on the actuating mechanism 7.

For stage I, the intake port 10 is connected to a back-pressure port 14, thereby allowing a back pressure to be applied to the back of piston 3. This back pressure on piston 3 permits the operation of the unloaded intensifier 1 to be balanced when no compression takes place.

Referring to FIG. 2, there are three main components of the overall system. These three components are joined by fuel passages which connect each one of the components to the other two components. The first main component is fuel storage vessel 18. Storage vessel 18 is a pressure rated vessel which holds compressed gaseous fuel. While only one vessel 18 is shown, it will be understood that a vehicle may use several storage vessels to increase the amount of gaseous fuel which can be stored on board the vehicle. As the fuel is consumed, the fuel pressure decreases in storage vessel 18. The second component is an intensifier 1, as described previously. The third component is an accumulator 17.

The storage tank 18 is connected to the intake valve 10 of the piston 3 side of the intensifier by fuel line 21. The exhaust valve 12 is connected through an intercooler 19 and line 22 to intake valve 11. A solenoid valve 15 is located between lines 21 and 22. The exhaust valve 13 is connected by line 23 and intercooler 20 to gas accumulator 17. Lines 22 and 23 are also bridged by a solenoid valve 16.

Unloaded conditions are allowed by opening the solenoid valves 15 and 16 between the intake and exhaust stroke of each stage. (Balancing is important to reduce wear on parts. This is particularly important in heavy-duty applications where reliability is a priority.)

The operation of the intensifier system is as follows. When the pressure in the accumulator 17 is below pressure P1, as indicated by pressure gauge P1, the solenoid valve 16 is closed. If the fuel storage tank 18 pressure is below pressure P3, as indicated by pressure gauge P3, which is below pressure P1, the solenoid valve 15 is also closed. As the moving bloc 7 moves to the right, gas from the fuel tank 18 flows into the first stage cylinder housing piston 3 through intake valve 10. As the moving bloc 7 moves to the left, the gas is compressed by the piston 3 in the first stage I and then flows out the exhaust valve 12. The gas is cooled in an inter-cooler 19 before entering the second stage II. Gas is introduced in the second stage II and the second chamber housing piston 4 upon leftward motion of the moving bloc 7, and is subsequently compressed upon rightward motion of the bloc 7. The compressed high-pressure gas is transmitted through line 23 and then through a heat exchanger 20 before entering the accumulator 17.

Another operating mode occurs when the pressure in the storage tank 18 is greater than pressure P3. The solenoid valve 15 is then opened, and the first stage I produces no compression of the gas. Only the second stage II is then used to bring the gas to high pressure P1.

Another operating mode occurs when the pressure of the accumulator 17 reaches pressure P2, as indicated by pressure gauge P2, which is greater than operating P1. Pressure P1 is below and pressure P2 is above the required injection pressure respectively. The accumulator 17 is then considered full and intensification is not needed. The solenoid valves 15 and 16 are then opened, leaving the intake and exhaust of each stage connected thereby producing no compression.

The following table summarizes the features of the intensifier that permit it to deal with the special application.

| Application Particularity | Feature | Device |
|---|---|---|
| Variable Intake Pressure | Sizing of first and second stage optimized for best balance under a wide range of pressure ratios | ratio of piston sizes |
|  | Capability of running only second stage | control system |
| Variable Fuel Flow | Connect exhaust to intake when no compression needed | control system |
|  | Balancing of intensifier for idle running | use back pressure on back of first stage to balance |

Accumulator 17 is a pressure vessel, and is typically much smaller than fuel storage vessel 18. Accumulator 17 is used to hold gaseous fuel at a pressure within a pre-determined acceptable operating range. Compressed gaseous fuel from accumulator 17 is supplied to the fuel injectors of an internal combustion engine in known fashion. Exhaust valve 13, which is one-way, prevents the compressed gaseous fuel in accumulator 17 from flowing back to fuel storage vessel 18 when the pressure in accumulator 17 is higher than the pressure in fuel storage vessel 18, which is virtually all of the time.

A feature of the invention is the arrangement of the fuel passages which connect the three main components together. The fuel passages must be pressure rated to handle high pressure gaseous fuel. The fuel passages may be tubing, pipes, hoses, or passages formed in the housing 2 of intensifier 1.

A control apparatus, which is typically a computer, is used to control fuel flow through first and second by-pass passages 38, 40 respectively. The control apparatus includes first by-pass solenoid valve 15 which controls the flow through the first by-pass passage between lines 21 and 22, and second solenoid by-pass valve 16 which controls the flow through the second by-pass passage between lines 22 and 23. The control apparatus also includes first, second and third pressure gauges P1, P2 and P3 respectively, which measure fuel injection pressure and the fuel pressure in accumulator 17 and fuel storage vessel 18.

The control apparatus operates the solenoid by-pass valves 15 and 16 according to the pressure in accumulator 17 and fuel storage vessel 18. When the pressure in accumulator 17 is greater than a pre-determined pressure P1, which is greater than the desired injection pressure into the engine, accumulator 17 is full and there is no current need for compressed fuel. Intensifier 1 continues to operate but the fuel supply system is operating in an idle mode without compressing any fuel.

In the idle operating mode, both of the solenoid by-pass valves 15 and 16 are open. Fuel pressure in all fuel lines is equalized and because the inlets and outlets of the first and second compression chambers 24, 25 containing pistons 3 and 4 are all connected, there is no compression. When the first compression chamber 24, with first piston 3, is undergoing a compression stroke, the second compression chamber 25 with second piston 4 is undergoing an intake stroke.

Because fuel pressure in the fuel supply system is equalized in the idling mode, fuel pressure in first and second compression chambers 24, 25 is also equalized during respective intake and compression strokes. First and second pistons 3, 4 are both driven by the same actuating mechanism 6, 7. Since the end surface area of second piston 4 is less than the end surface area of first piston 3, the load applied to the actuating mechanism 6, 7 would not be balanced without the existence of back pressure port 14 behind first piston 3.

Intercooler 20 is a heat exchanger and is installed in line 23 to cool the compressed gaseous fuel before it enters accumulator 17. Without heat exchanger 20, heat energy transferred from second compression chamber 25 might otherwise ignite the compressed fuel in accumulator 17.

No gaseous fuel is compressed in first compression chamber 24 while by-pass passage 15 is open since the inlet and outlet of first compression chamber 24 remain connected.

If the pressure in fuel storage vessel 18 is less than a pre-determined pressure P3, first solenoid by-pass valve 15 is also closed, initiating a high capacity mode of operation. In the high capacity mode first and second compression chambers 24, 25 operate in series. The gaseous fuel compressed in first compression chamber 24 flows through second line 22 to the inlet of second compression chamber 25. First compression chamber 24 increases the pressure of the gaseous fuel entering second compression chamber 25. By utilizing both first and second compression chambers 24, 25 the supply fuel pressure increases more rapidly, allowing intensifier 1 to accommodate fuel supplied at a lower pressure.

Intercooler 19, which is a heat exchanger, is installed in line 22 to cool the fuel from first compression chamber 24 before entering second compression chamber 25. Without heat exchanger 19, heat transferred from first compression chamber 24, combined with the heat generated in second compression chamber 25 might cause the fuel in second compression chamber 25 to ignite.

Figure 3:
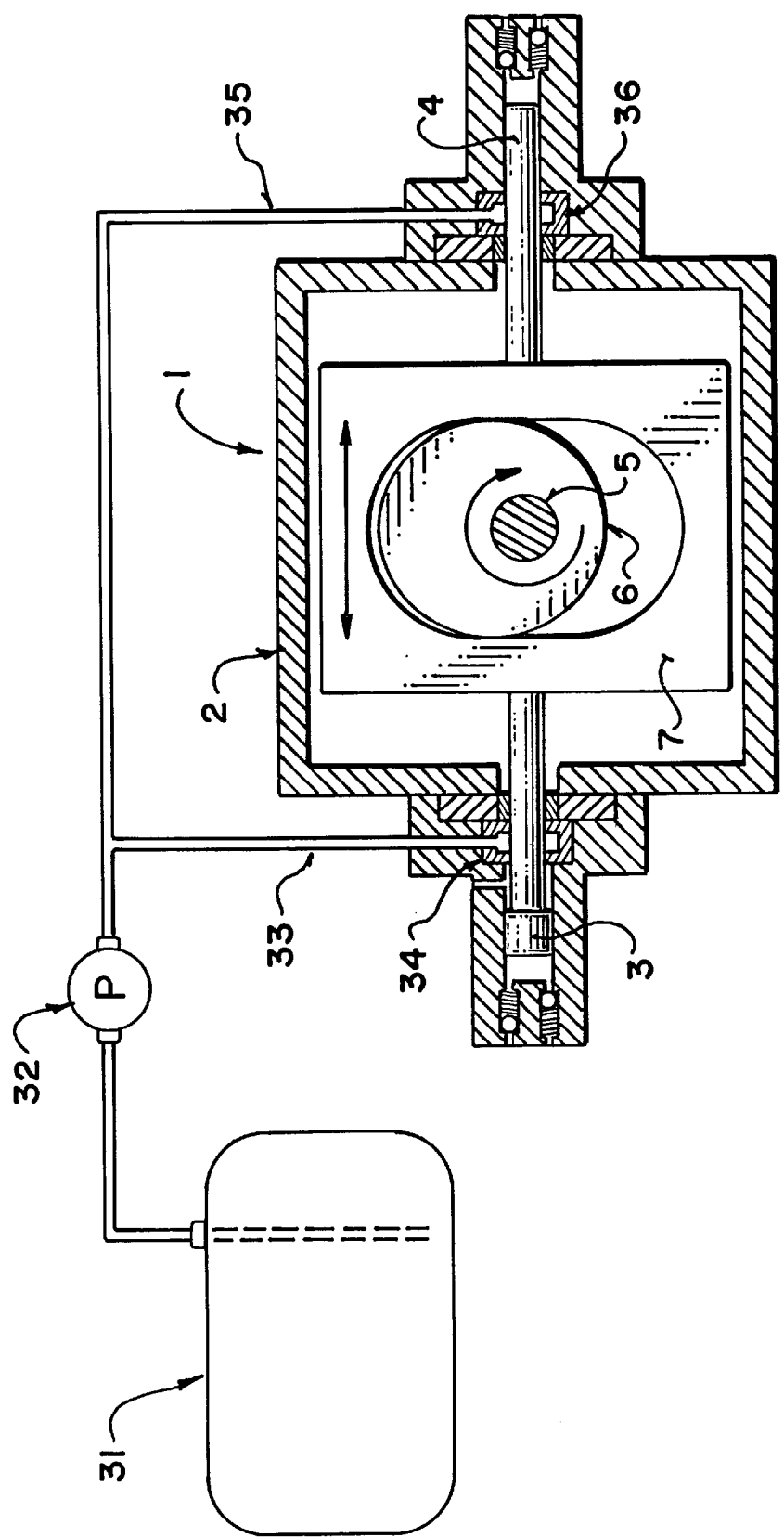
FIG. 3 represents an embodiment of the apparatus which illustrates the method of high pressure oil sealing to prevent any leakage of blowby gas to the crankcase.

FIG. 3 shows, in one embodiment of the intensifier, a tank 31 containing sealing oil which is pressurized by pump 32 and conducted by line 33 to the high pressure sealing location 34 of the first compression stage, and likewise conducted by line 35 to the high pressure sealing location 36 of the second compression stage.

Mode of Operation with Variable Inlet Pressure

Figure 4:
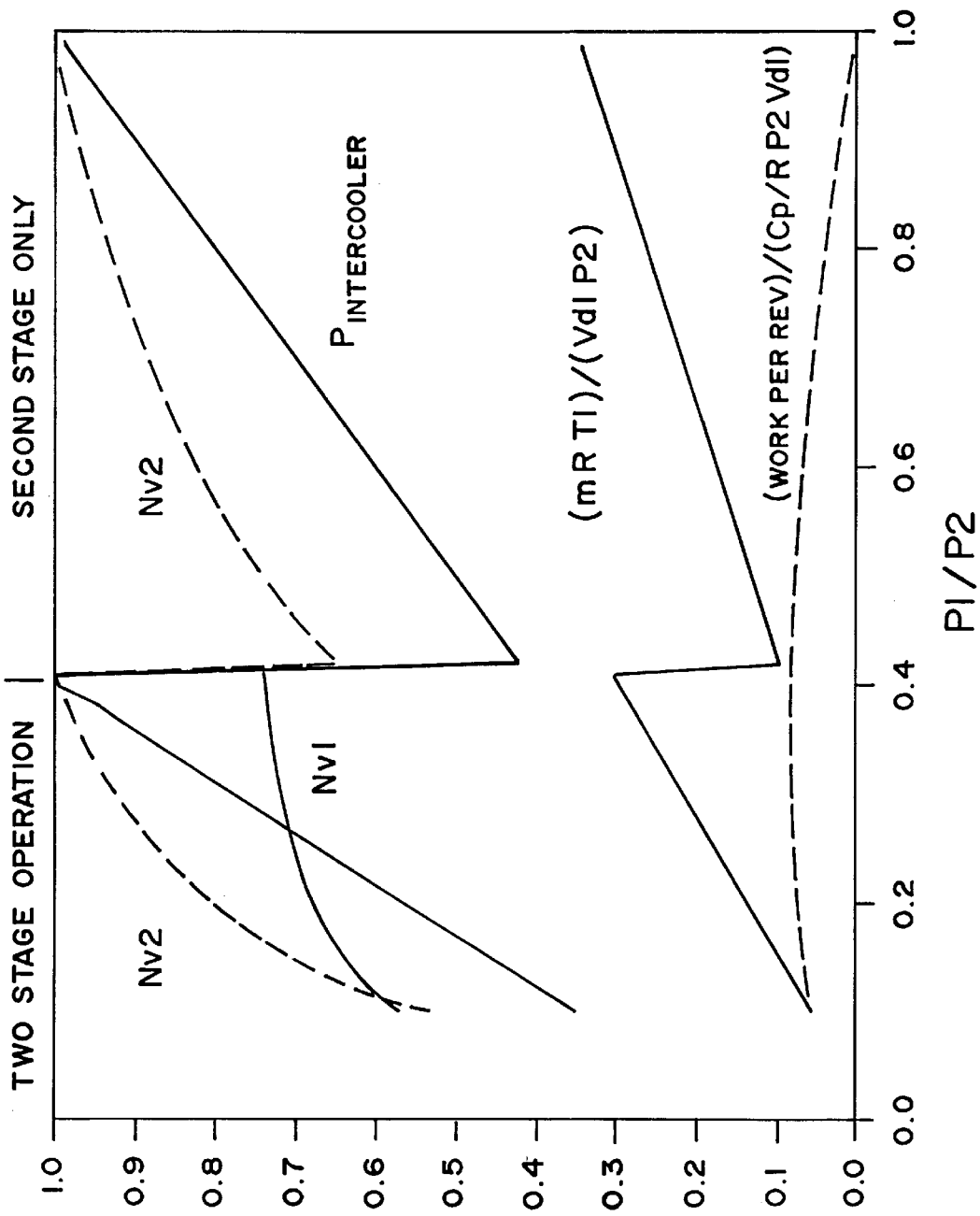
FIG. 4 illustrates a plot of the characteristics of intensifier operation when the inlet-to-outlet pressure ratio $P_1/P_2$ varies from 0.1 to 1.0 (with the outlet pressure $P_2$ being held constant).

FIG. 4 shows, as an example, the characteristics of the operation of the intensifier 1 when the inlet-to-outlet pressure ratio $P_1/P_2$ varies from 0.1 to 1.0 (with the outlet pressure $P_2$ being held constant).

Shown are the curves of volumetric efficiency $N_{V1}$ and $N_{V2}$ for the first and second stages I and II, respectively. Also shown is the ratio $P_{interstage}/P_2$, in which $P_{interstage}$ is the interstage pressure. At the lowest inlet pressure this interstage pressure ratio is about 0.33 in this example, which implies about equal pressure ratio per stage.

As the inlet pressure rises above 0.1 times $P_2$, the interstage pressure in line 22 rises till at some point it is close to the outlet pressure. Accompanying this pressure increase is a small increase in the first-stage I volumetric efficiency, and a large increase in the second-stage II volumetric efficiency, as the pressure ratio across the second stage approaches 1.0. Past that point, the first stage I is bypassed and only the second stage II is used for compression. The interstage pressure therefore drops to the inlet pressure $P_1$ which is now the same as $P_{intercooler}$.

FIG. 4 also shows what happens to the mass flow per revolution of the intensifier 1. Here the dimensionless quantity (m R $T_1$)/($V_{d1}P_2$) is used, in which m is the quantity of fuel mass delivered per stroke, R is the gas constant, $T_1$ is the gas inlet temperature, $V_{d1}$ is the first stage displacement volume, and $P_2$ is the outlet pressure. All quantities except m being constant, the curve with this designation directly indicates the relative variation of mass flow per revolution as the inlet pressure changes.

The stage displacement volumes are chosen so that at minimum inlet pressure the intensifier 1 will meet maximum engine fuel demand (and, in this example, so that at minimum inlet pressure the stage pressure ratios are about equal). As FIG. 4 indicates, the fuel supply rate will rise with rising inlet pressure reaching as high as 5 or 6 times the maximum engine demand. When the intensifier fuel supply exceeds the engine demand both first and second stages I and II of the intensifier 1 are bypassed, while the engine draws directly from the gas accumulator 17 placed at the intensifier outlet 13.

Also shown in FIG. 4 is the variation in work per revolution with inlet pressure ratio. Here the dimensionless work parameter employs the constants previously mentioned as well as Cp which is the gas specific heat. The curve indicates that the work per revolution (while the intensifier is in operation) reaches a maximum which is about 45% higher than when the inlet pressure is minimum. As the inlet pressure has risen, the work per unit mass has dropped but the mass ingested per revolution has risen disproportionately.

Figure 5:
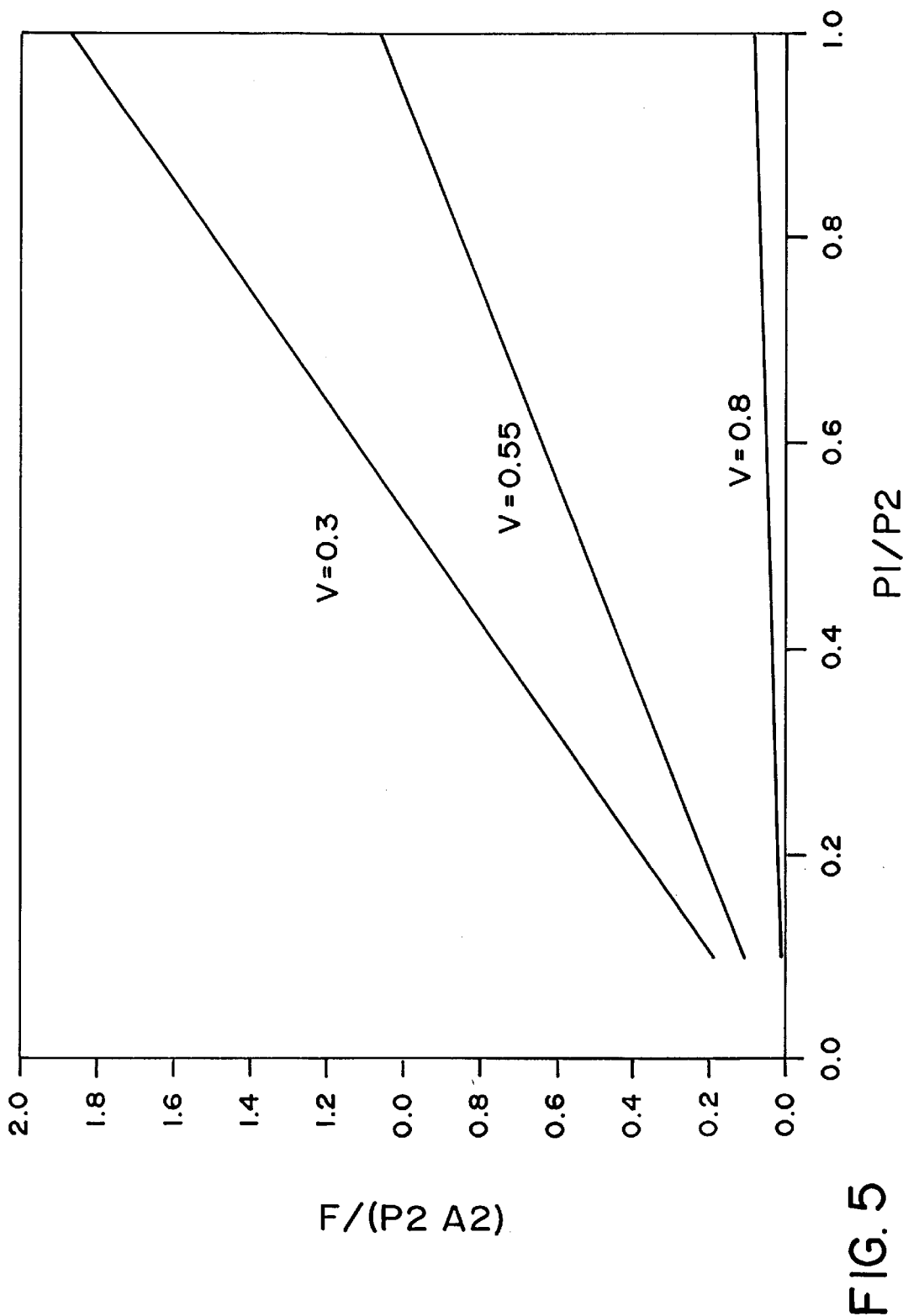
FIG. 5 illustrates a plot of unbalanced force in unloaded operation.

A potentially serious problem might occur when the intensifier 1 is operating with both stages I and II bypassed during relatively long periods when the inlet pressure is high and there is unbalanced pressure loading. FIG. 5 indicates that in this case (V=0.3), the maximum unbalanced pressure load on the yoke could approach approximately $2P_2A_2$, in which $A_2$ is the area of the second stage piston. The product $2P_2A_2$ could be of the order of two tons of force.

The calculations whose results are shown in FIG. 4 employed the concept of polytropic compression with polytropic compression index assumed to be 1.25 for both first and second stages. The stage clearance ratios were assumed to be 0.25 and 0.35 for the first and second stages, respectively. For each stage, the volumetric efficiency $N_v$ was estimated from $N_v = 1 - \epsilon(PR)1/n = 1$, in which $\epsilon$ is the stage clearance ratio and n is the polytropic index. The symbols PR indicate the outlet-to-inlet pressure ratio for the stage in question. For these calculations the stage volume displacements were related (as an example) by $$V = \frac{V_{d2} T_1}{V_{d1} T_{intercooler}} = 0.3$$

in which $V_{d1}$ and $V_{d2}$ are the displacements of the first and second stages, respectively. $T_1$ is the first stage inlet temperature, and $T_{intercooler}$ is the second stage inlet temperature. In the calculations for FIG. 3, the ratio $T_{intercooler}/T_1$ was assumed to be 1.16. The interstage pressure was determined by equating mass delivered by first and second stages I and II.

Figure 6:
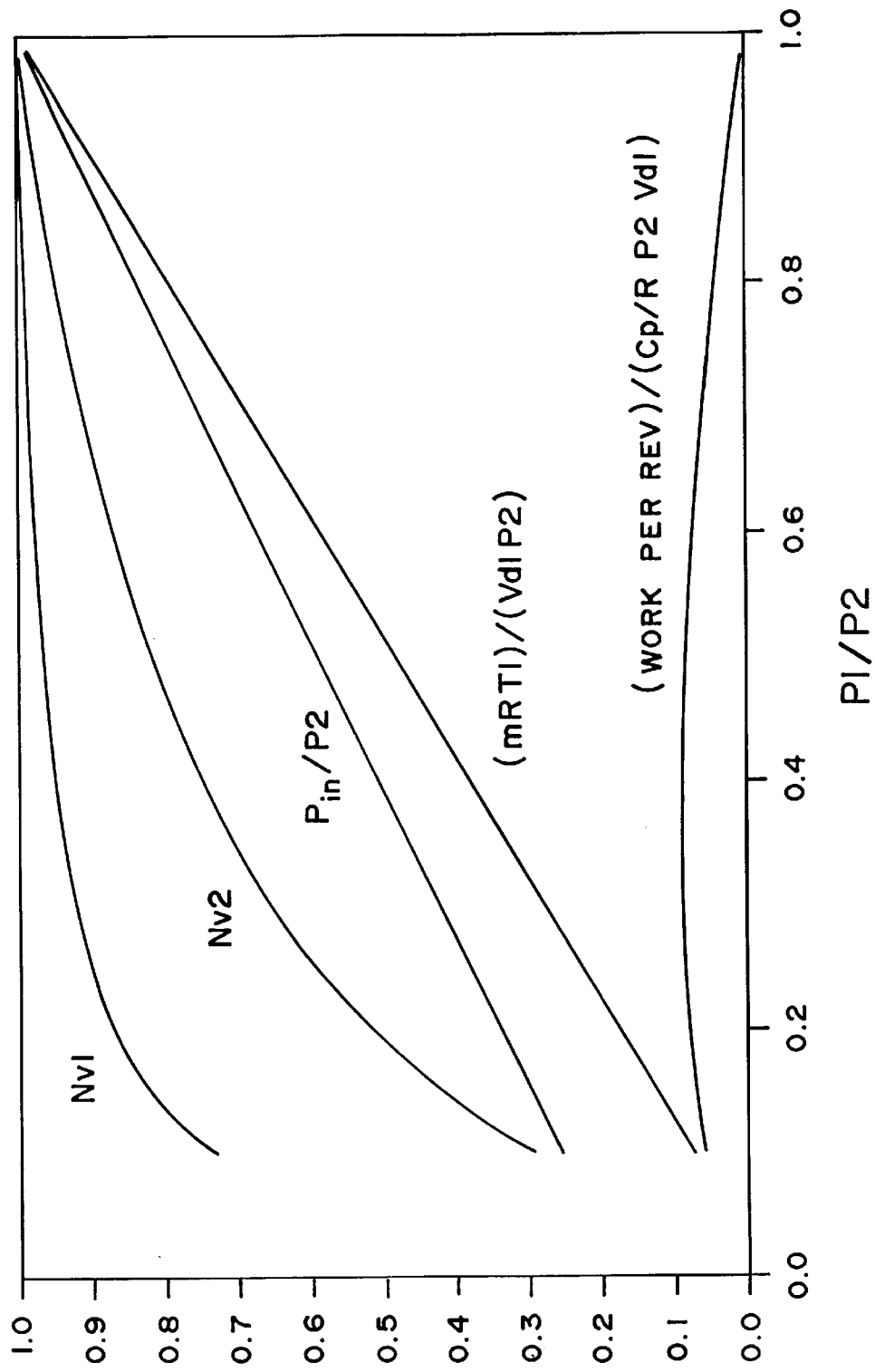
FIG. 6 illustrates the operation of an intensifier over the same range of pressure ratio as FIG. 3, but with a different displacement volume ratio, taken as V=1.

As a second example, FIG. 6 shows the operation of an intensifier over the same range of pressure ratio as FIG. 4 but with a different displacement volume ratio (defined above), taken as V=1. Here at minimum supply pressure, the first and second stage pressure ratios are about 2.5 and 4, respectively, and the corresponding volumetric efficiencies differ considerably. In this case, however, the interstage pressure ratio approaches unity only at the upper end of the inlet pressure range; both stages are active throughout and there is need for only one bypass valve. The unbalanced pressure load during intermittent unloaded operation is much less, as is shown by FIG. 5.

FIGS. 4, 5 and 6 indicate the need for a strategy to match the intensifier supply and the compressor demand over the range of inlet pressures and call for controlled intermittent operation of either both stages or the second stage only with due attention to force unbalance.

Where two or more gaseous fuel tanks are provided, as is common in fueling vehicle engines, the intensifier can be used in this environment. In this case, the effect of two-stage operation at lowest fuel tank pressure can be obtained with a first stage by using the first compression end of the intensifier to compress the gas from the tank with the lowest pressure to an intermediate pressure tank and subsequently, the second compression end of the intensifier can be used for compression taking place between the intermediate pressure tank and the accumulator which supplies the gaseous fuel directly to the engine.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for supplying high pressure gaseous fuel to a fuel injector of an internal combustion engine, said apparatus comprising:
   (a) a fuel storage vessel;
   (b) an intensifier having a first compression chamber with a first piston therein, and a second compression chamber with a second piston therein;
   (c) an accumulator vessel for holding a quantity of gaseous fuel at an injection pressure within a predetermined acceptable operating range; and,
   (d) a plurality of fuel lines for directing flow of said gaseous fuel from said storage vessel to said accumulator vessel and for providing direct connections between said fuel storage vessel, said intensifier, and said accumulator vessel, said fuel passages including:
      (i) a first fuel line for connecting an outlet from said fuel storage vessel to a first inlet to said first compression chamber;
      (ii) a second fuel line for connecting a first outlet from said first compression chamber to a second inlet to said second compression chamber;
      (iii) a third fuel line for connecting a second outlet from said second compression chamber to an inlet to said accumulator vessel;
      (iv) a first closeable by-pass passage, connecting the first fuel line with the second fuel line; and
      (v) a second closeable by-pass passage, connecting the fuel line with the third fuel line.

2. An apparatus as defined by claim 1 further including a control apparatus for automatically controlling fuel flow through one or the other or both of said first and second closeable by-pass passages based upon fuel pressure measurements at said accumulator vessel and said fuel storage vessel.

3. An apparatus as defined by claim 2, said control apparatus further including:
   (a) a first valve mounted in said first by-pass passage for controlling fuel flow through said first by-pass passage; and
   (b) a second valve mounted in said second by-pass passage for controlling fuel flow through said second by-pass passage.

4. An apparatus as defined by claim 3, said control apparatus further including:
   (a) a first pressure measuring instrument associated with said fuel storage vessel to measure pressure of said gaseous fuel in said fuel storage vessel; and
   (b) a second pressure measuring instrument associated with said accumulator vessel for measuring pressure of said gaseous fuel in said accumulator vessel.

5. An apparatus as defined by claim 1 further including a passage connecting a compartment located behind said first piston of said first compression chamber on a side opposite to the first compression side of the first piston for enabling pressures in said first compression chamber to balance.

6. An apparatus as defined by claim 1 further including a check valve on each of said first and second inlets and said first and second outlets of said first and second compression chambers for controlling the direction of flow of said gaseous fuel.

7. An apparatus as defined by claim 6 further including a heat exchanger associated with said second fuel line for cooling gaseous fuel after it has been compressed by the first piston in said first compression chamber.

8. An apparatus as defined by claim 1 further including a heat exchanger associated with said third fuel line for cooling gaseous fuel after it has been compressed by the second piston in the second compression chamber before it enters said accumulator vessel.

9. An apparatus as defined by claim 1 wherein said first piston has a larger end area than said second piston, for balancing the forces during respective compression strokes and to accommodate differences in volumetric flow through said first and second compression chambers caused by compression of said gaseous fuel in said first compression chamber.

10. An apparatus as defined in claim 1 including:
    (e) a sealing oil storage tank;
    (f) a sealing oil pump connected to the sealing oil tank;
    (g) a first sealing oil line from the sealing oil pump to a high pressure sealing location associated with the first compression chamber; and
    (h) a second sealing oil line from the sealing oil pump to a high pressure sealing location associated with the second compression chamber.

11. An apparatus as claimed in claim 1 including at least two gaseous fuel storage vessels and the effect of two stage operation is obtained by sequential use of a single stage in first compressing the gaseous fuel from a low pressure tank to an intermediate pressure tank, and then compressing the gaseous fuel from the intermediate pressure tank to the accumulator vessel which directly supplies the engine.

\* \* \* \* \*